A. L. HASKELL.
Horse Rake.
No. 69,913.
Patented Oct. 15, 1867.
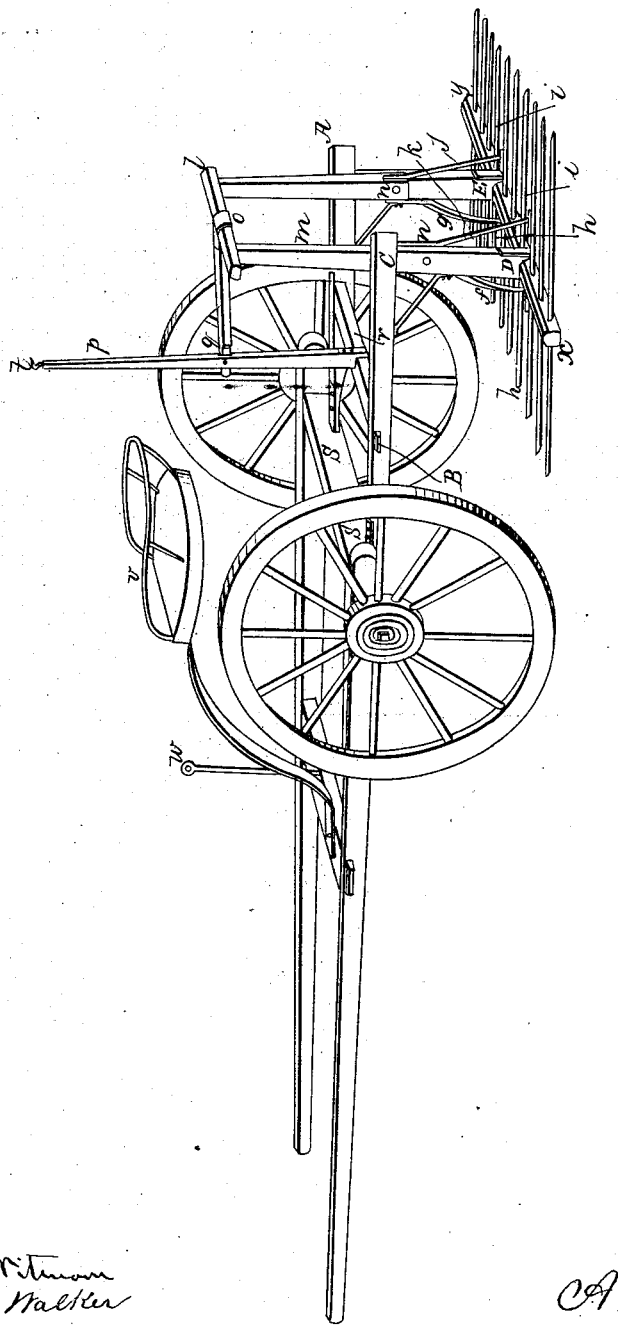
Inventor
A. L. Haskell

United States Patent Office.

ANDREW L. HASKELL, OF AMITY, PENNSYLVANIA.

Letters Patent No. 69,913, dated October 15, 1867.

IMPROVEMENT IN HORSE-RAKES.

*The Schedule referred to in these Letters Patent and making part of the same.*

TO ALL WHOM IT MAY CONCERN:

Be it known that I, ANDREW L. HASKELL, of Amity township, in the county of Erie, and State of Pennsylvania, have invented a new and useful Improvement in Horse Hay-Rakes, of which the following is a full, clear, and exact description, reference being had to the accompanying drawing, which makes part of this specification, and which represents a view in perspective of my improved horse-rake.

My invention relates to that class of horse hay-rakes in which a rake revolving on a horizontal axis is hinged to a frame travelling on wheels, the rake sliding on the ground with its teeth parallel to its surface, and being tipped or revolved by its teeth sticking into the ground; and my improvement consists in a novel mode of constructing such a rake, as hereinafter shown.

In the accompanying drawing a frame, S, like that of a common cart, is shown as mounted on two wheels. The shafts are rigidly secured to this frame or axle. The rake-frame is hinged to the axle by pivots $s$, which allow it to play freely vertically. This frame consists of two horizontal parallel beams A C, projecting beyond the peripheries of the wheels, and having vertical down-hangers D E on their rear ends. The shaft X of the rake is mounted in bearings Y, on the lower end of these down-hangers. The standards or down-hangers are strengthened by diagonal braces $d$. Two arms $m$ are attached at their lower ends to the down-hangers by pivots $n$, and connected at top by a cross-bar, $o$, thus forming a gallows-frame, free to play on its pivots in a vertical plane parallel to the drag-bars A C. A lever, $p$, is pivoted at bottom to a cross-bar, B, connecting the drag-bars, and connected near its middle to the gallows-frame by a link-rod, $q$. A hook, $t$, on the upper end of this lever, when the rake is lifted, catches in a hook, $w$, on the frame, and thus holds the rake up for transportation. The driver's seat $v$ is mounted on a spring bolted to the left shaft, or on the front cross-bar close to that shaft, so as to leave room for the play of the lever $p$, which is in the centre of the frame. Stiff springs or rods $f\ g$ project downward from the front of the rocking-frame $m$, and corresponding ones, $j\ k$, from the rear thereof. The ends of these springs abut against short stop-pins $h\ i$, projecting at right angles to the rake-shaft, parallel with its teeth, and extending on both sides of the shaft.

The operation is as follows: The rake is shown in the drawing as running along on the ground, to gather up the hay, in which position it is held by the ends of the springs $f\ g\ k\ j$ pressing on the pins $h\ i$. By drawing the lever $p$ slightly forward the driver causes the front springs $f\ g$ to approach nearer the rake-shaft, while the hind springs $j\ k$ correspondingly recede. This movement depresses the teeth in front, and causes them to run under the hay more readily. To discharge the load the driver draws the lever $p$ further forward. This releases the back springs $j\ k$ from the stop-pins, and the rake is revolved by its front teeth catching in the ground, and the load discharged. The hinging of the frame permits the rake readily to rise over the load discharged. When the rake has made a half turn, what were the rear teeth become the front ones, the springs resume their places, and the above-described operation is repeated.

In order to lift the rake sufficiently to pass obstructions, or to carry it from place to place, the lever $p$ is swung forward and hooked into the eye $w$ of the standard attached to the cross-bar of the thills, in which position the rake is lifted clear of the ground.

From the foregoing description it will be seen that by mounting the driver's seat on the rigid shafts, or on the cross-bar which connects them, the driver is not disturbed by the oscillation of the rake, while by hinging the rake-frame between the wheels, and letting it extend back beyond their peripheries, a rake longer than the distance between the wheels can be used, and allowed to vibrate freely without striking the wheels. Moreover, by my invention the same lever tips, revolves, and lifts the rake, and locks it in this latter position.

I am aware that rakes of this class have heretofore been used, and do not claim broadly any of the elements above described, but having thus fully described the construction and operation of my improved rake, what I do claim as my invention, and desire to secure by Letters Patent, is—

1. The combination of the main frame S, the vibrating rake-frame A C, the rocking frame $m$, and the lever $p$, when all these parts are constructed and arranged for joint operation as and for the purpose described.

2. The combination, in a two-wheeled horse-rake, of rigid shafts projecting from the axle, a driver's seat mounted on the front cross-bar near the left shaft, a vertically vibrating frame hinged to the rear of the axle and carrying a revolving rake, a rocking frame pivoted to the vibrating frame, and carrying springs to control the rake, and a lever pivoted on the vibrating frame linked to the rocking frame, and carrying a hook taking into an eye on a standard in front of the axle, by which to fasten the rake when lifted up, all constructed, arranged, and operating as described.

A. L. HASKELL.

Witnesses:
J. W. WETMORE,
GEO. W. WALKER.